UNITED STATES PATENT OFFICE.

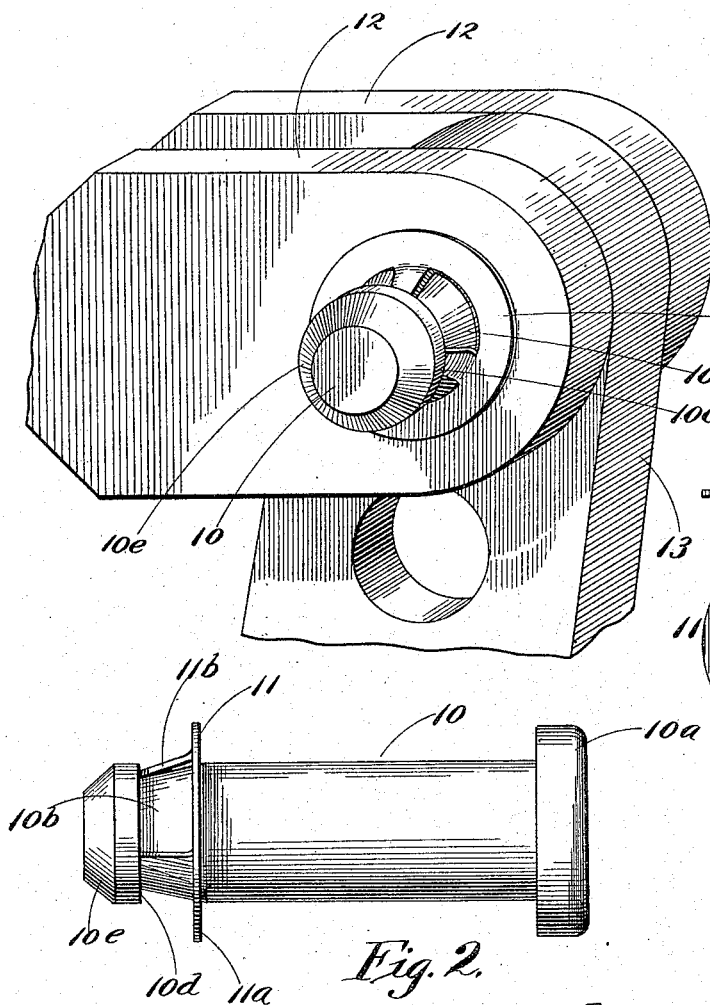

GEORGE C. MURRAY, OF CHICAGO, ILLINOIS, ASSIGNOR TO KEYOKE RAILWAY EQUIPMENT COMPANY, A CORPORATION OF DELAWARE.

PIN AND RETAINING MEMBER.

1,175,550.  Specification of Letters Patent.  Patented Mar. 14, 1916.

Application filed April 3, 1914. Serial No. 829,382.

*To all whom it may concern:*

Be it known that I, GEORGE C. MURRAY, a citizen of the United States, residing at Chicago, in the county of Cook and State of Illinois, have invented certain new and useful Improvements in Pins and Retaining Members, of which the following is a specification.

This invention relates to improvements in pins and retaining members, and has for its object to provide a pin for pivotal mounting or connection of necessary elements such as railway brake beams and levers and the like, together with a retaining member capable of easy attachment thereto, but which may not be displaced from said pin when once attached thereto without requiring considerable trouble or its destruction.

A number of accidents have resulted in railway operation, due to the displacement of pivot pins securing brake rods and levers together, owing to the accidental loss or theft of the cotter pins which are ordinarily used to secure such pins against removal.

My invention comprises the provision of a new form of pin with which coacts a retaining member, as I term it, which, as stated above, may be readily attached to secure the bodies or elements on the pin which may not be accidentally displaced therefrom.

These and other objects will be set forth and made apparent in the following specification and accompanying drawing, in which:

Figure 1 is a perspective detail of a brake beam lever connection showing my device in assembled relation; Fig. 2 is a side elevation of the pin with the retaining member thereon; Fig. 3 is a side elevation of the blank from which I form the retaining member showing in dotted lines the position to which the fingers are ordinarily bent; Fig. 4 is a plan view of the same; Fig. 5 is a perspective of a modified form of retaining member, and Fig. 6 is a detail showing the same attached to a pin.

Like numerals refer to like elements throughout the drawings, in which—

10 designates what I term a pivot pin having the flange or head $10^a$ at one end thereof. Adjacent its other end I taper a portion indicated by numeral $10^b$ to provide a portion of reduced diameter, thereby forming a head $10^c$ having the shoulder $10^d$. The head $10^c$ is preferably tapered or of a frusto-conical contour adjacent its outer end, as indicated by numeral $10^e$, for a purpose to be hereinafter described. Coacting with the pin 10 is what I term a retaining member 11. This member, in the form shown in Figs. 1 to 4, comprises a collar portion $11^a$ having inwardly directed fingers $11^b$, which are bent to project outwardly from the collar portion $11^a$, as indicated for example in Figs. 1 and 2. By selecting proper material, such as steel or phosphor-bronze, the fingers $11^b$ will possess a spring-like characteristic, owing to the character of the material.

The use and operation of the device is illustrated, for example, in Fig. 1, where I have shown brake rods 12 perforated at their ends and inclosing a brake lever 13, the end of the latter being located between the ends of the former, and all three being apertured for pivotal mounting upon the pin 10. When the same has been placed upon the pin the retaining member 11 is forced over the tapered end $10^e$, the springing quality of the fingers $11^b$ permitting their being forced over the head $10^c$ and after passing over said head they will spring to seat in the portion of reduced diameter of the pin 10, as clearly shown in Fig. 2. The ends of the fingers $11^b$ will be adapted to contact with the shoulder $10^d$, and when side force is applied to the collar portion $11^a$ of the retaining member 11, these fingers $11^b$ will, by virtue of their contact with shoulder $10^d$, prevent displacement of the collar $11^a$ and serve to retain the beams 12—13, or the like, on the pivot pin. This provides a positive locking arrangement with which careless assembling is impossible and with which disassembling is practically impossible without destruction of the retaining member 11, by chiseling off fingers $11^b$ or going to the trouble to bend them outwardly to enable their slipping over head $10^d$. In any event, accidental displacement of the collar 11 is impossible.

In Figs. 3 and 4 I have illustrated a convenient way of manufacturing the retaining members 11 by utilizing a disk A and punching the same to provide the three inwardly extending fingers B, which may be then bent upwardly, as indicated in dotted lines in Fig. 3.

In Figs. 5 and 6 I have illustrated a modification of my device in which I provide a thimble or sleeve 15, split along one side, as indicated by numeral $15^a$ and provided with the peripheral flange or collar $15^b$ at one end thereof. The sleeve or thimble 15 is suitably slotted to permit bending inwardly of the finger $15^c$. This sleeve, of course, may be constructed by spinning or the like from a single piece of metal, but I find it convenient to construct the same of a flat plate, rolling it to cylindrical shape. Furthermore, the split $15^a$ will serve to add resiliency or spring action to the thimble. The arrangement is similar to that shown in the preceding figures, the thimble 15 being of a size to permit its slipping over head $10^d$ to the position shown in Fig. 6, the finger $15^c$ being capable of springing out to slide over the head and springing back to the position indicated in Fig. 6. This arrangement not only provides a suitable retaining member, but also provides a thimble which may take up wear ordinarily received by the pivot pin 10.

It will be obvious that my device is susceptible of many changes and modifications, and I do not wish to be restricted thereto beyond the scope of the appended claims.

What I claim is:—

1. In combination, a pin having a shoulder, a retaining member having an aperture permitting slipping of said member over said shoulder, and a finger projecting inwardly relative to said aperture, said finger being arranged to slip over said shoulder when said member is placed on said pin and to coact therewith to prevent removal of said member therefrom.

2. In combination, a pin having a shoulder, a retaining member having an aperture permitting slipping of said member over said shoulder, and a plurality of fingers projecting inwardly relative to said aperture, said fingers being arranged to slip over said shoulder when said member is placed on said pin and to coact therewith to prevent removal of said member from said pin.

In testimony whereof, I have subscribed my name.

GEORGE C. MURRAY.

Witnesses:
HENRY A. PARKS,
EDYTHE M. ANDERSON.

Copies of this patent may be obtained for five cents each, by addressing the "Commissioner of Patents, Washington, D. C."